US009226064B2

(12) United States Patent
Vumbaco et al.

(10) Patent No.: US 9,226,064 B2
(45) Date of Patent: Dec. 29, 2015

(54) WIRELESS SWITCHING OF EFFECTS PEDALS WITH STATUS UPDATES

(71) Applicant: FXCONNECTX, LLC, Holiday, FL (US)

(72) Inventors: Michael Vumbaco, Holiday, FL (US); James Arcidiacono, Holiday, FL (US)

(73) Assignee: FXCONNECTX, LLC, Holiday, FL (US)

( * ) Notice: Subject to any disclaimer, the term of this patent is extended or adjusted under 35 U.S.C. 154(b) by 243 days.

(21) Appl. No.: 13/797,804

(22) Filed: Mar. 12, 2013

(65) Prior Publication Data

US 2014/0270266 A1 Sep. 18, 2014

(51) Int. Cl.

*H02B 1/00* (2006.01)
*H04B 1/00* (2006.01)
*G10H 7/00* (2006.01)
*H04R 3/00* (2006.01)

(52) U.S. Cl.

CPC .............. *H04R 3/00* (2013.01); *H04R 2420/01* (2013.01); *H04R 2420/07* (2013.01)

(58) Field of Classification Search

None

See application file for complete search history.

(56) References Cited

U.S. PATENT DOCUMENTS 5,576,507 A 11/1996 LaMarra
5,700,966 A 12/1997 LaMarra
7,842,875 B2 11/2010 Villa et al.
2005/0056142 A1 3/2005 Mapleston et al.
2008/0216638 A1 9/2008 Hustig
2009/0129605 A1 5/2009 Camp, Jr. et al.
2010/0269670 A1 10/2010 O'Connor et al.
2010/0275760 A1 11/2010 Gain et al.
2011/0025912 A1 2/2011 Regler
2012/0160079 A1 6/2012 Little et al.
2013/0118340 A1* 5/2013 D'Amours .............. G10H 1/32 84/746
2013/0208954 A1* 8/2013 Rowe .................. H04B 1/3827 382/119

FOREIGN PATENT DOCUMENTS

EP 2031904 A2 3/2009
EP 2129166 A2 12/2009
KR 10-2011-0107516 A 10/2011
WO WO 2011/118900 A1 9/2011
WO WO 2012/058646 A1 5/2012

OTHER PUBLICATIONS

International Search Report and Written Opinion for International Application No. PCT/US2012/059407, filed Oct. 9, 2012, mailed Jan. 29, 2013, 9 pages.
International Search Report and Written Opinion for International Application No. PCT/US2012/063743, filed Nov. 6, 2012, mailed May 16, 2013, 10 pages.

* cited by examiner

*Primary Examiner* — Regina N Holder
(74) *Attorney, Agent, or Firm* — Christie, Parker & Hale, LLP

(57) ABSTRACT

A system for wireless control of audio signal switching. The system includes a remote unit, having a physically actuated switch and a remote unit status indicator, and a main unit. The main unit includes a main unit transceiver and one or more relays which may switch the path of the audio signal or provide remote control of external devices, in response to input at the physically actuated switch. The main unit may send status updates to the remote unit, allowing the remote unit to display the current state of the main unit to a user at the remote unit.

19 Claims, 11 Drawing Sheets

WIRELESS SWITCHING OF EFFECTS PEDALS WITH STATUS UPDATES

FIELD

The present invention relates to the switching of audio signals for the purpose of configuring audio effects, and more particularly to a system for controlling such a system by hand-actuated or foot-actuated wireless mechanisms.

BACKGROUND

When performing music using an amplified instrument it is often desirable to modify the audio signal electronically, with modifications referred to as effects, before amplifying the signal and converting it to audible sound. For example, a musician playing an electric guitar may have one or more electronic effects pedals connected in a cascade between the guitar and the amplifier. Such an arrangement may result in long audio cables.

Even greater cable lengths may be needed, for example, if a musician is performing at the front of a stage using an electric guitar connected to a preamplifier at the back of the stage, when effects pedals are installed between the preamplifier and a power amplifier, also at the back of the stage. In this case it may be necessary to route the audio signal from the guitar at the front of the stage to the preamplifier at the back of the stage, and then to the effects pedals at the front of the stage and back to the power amplifier at the back of the stage, using audio cables spanning, in total, three times the depth of the stage. Long audio cables may compromise audio sound quality, and may interfere with a musician's ability to move about on the stage. Thus, there is a need for a system for connecting effects pedals into an audio signal system which avoids the need for long cables.

Musicians also may benefit from an ability to switch between a first set of active effects pedals, which may be referred to as a first effects patch, and a second effects patch (i.e., a second set of active effects pedals), with a single activation of a switch, instead of having to turn on the pedals in the first set, and turn off the pedals in the second set, individually. This benefit may extend to the situation in which some effects pedals in the first effects patch are the same as effects pedals in the second effects patch. Thus, there is a need for a system allowing convenient switching between effects patches.

When operating an effects pedal remotely, it may be helpful for the user to have an indication of the state of the effect, e.g., whether it is active or bypassed, even if the effects pedal is too distant to be easily seen, or hidden from view behind other equipment. Thus, there is a need, in a remote control system, for bidirectional communications allowing the user to obtain status updates, e.g., updates informing the user of the state of remotely controlled equipment.

SUMMARY

The present invention relates to wireless control of audio signal switching. In one embodiment, a remote unit transmits wireless control signals to a main unit, which, in response, switches an audio signal accordingly. The system for wireless switching and controlling of audio signals may be used for musical audio applications such as audio effects, effects pedalboards, mixers, and studio equipment. In one embodiment the implementation of bidirectional communications between the remote unit and the main unit allows the main unit to send status updates, i.e., updates informing the remote unit of the state of the main unit, to the remote unit, which displays the current state of the main unit to a user at the remote unit. In one embodiment, the remote unit is programmed with effects patches, allowing the user to activate or deactivate multiple channels in the main unit by pressing a single button on the remote unit.

According to an embodiment of the present invention there is provided a system for wireless control of audio signal switching, the system including: a first remote unit, the first remote unit including: a first wireless transceiver; a first physically actuated switch coupled to the first wireless transceiver; and a first status indicator coupled to the first wireless transceiver; and a main unit, the main unit including: a second wireless transceiver; an audio input; an effects send output; an effects return input; and an audio output; wherein: the first wireless transceiver is configured to transmit data packets to the second wireless transceiver, and the second wireless transceiver is configured to transmit data packets to the first wireless transceiver; the first remote unit is configured to change the state of the status indicator in response to data packets transmitted to the first wireless transceiver by the second wireless transceiver; and the main unit is configured to operate alternately in a first audio control state or in a second audio control state, and to transition between the first audio control state and the second audio control state in response to actuation of the first physically actuated switch, the main unit being configured to route an audio signal from the audio input directly to the audio output when operating in the first audio control state, and the main unit being configured to route an audio signal from the audio input to the effects send output, and to route an audio signal from the effects return input to the audio output when operating in the second audio control state.

In one embodiment, the system includes the unique security code to the second wireless transceiver.

In one embodiment, the first remote unit is configured to be configurable with any of 4.2 billion possible security codes.

In one embodiment, the main unit is configured to transition, upon receipt of appropriate user input, temporarily into a learn state, wherein, when operating in the learn state, the main unit is configured to acquire and store, in the main unit, a received security code.

In one embodiment, the system includes a security code stored in the main unit.

In one embodiment, the main unit includes a second physically actuated switch, and the user input includes actuation of the second physically actuated switch.

In one embodiment, the second physically actuated switch is a momentary contact switch, and the main unit is configured to transition into the learn state when the second physically actuated switch is actuated and to remain in the learn state while the second physically actuated switch remains actuated.

In one embodiment, the main unit includes a second status indicator, and the main unit is configured to cause the status indicator to indicate when the main unit acquires and stores, in the main unit, a received security code.

In one embodiment, the second status indicator is a light emitting diode (LED), and the main unit is configured to cause the LED to flash when the main unit acquires and stores, in the main unit, a received security code.

In one embodiment, the system includes information about the state of the main unit.

In one embodiment, the system includes information about the state of the main unit when the state of the main unit changes.

In one embodiment, the system includes information about the state of the main unit when a time interval has elapsed since the last time the first remote unit transmitted information about the state of the main unit.

In one embodiment, the time interval is 10 seconds.

In one embodiment, the first remote unit is configured to cause the first status indicator to indicate the state of the main unit.

In one embodiment, the first status indicator is a light emitting diode (LED), and the first remote unit is configured to illuminate the LED when the main unit is operating in the second audio control state.

In one embodiment, the system includes a second remote unit, the second remote unit including: a third wireless transceiver, configured to transmit data packets to the second wireless transceiver; and a second physically actuated switch coupled to the third wireless transceiver; wherein the main unit is configured to transition between the first audio control state and the second audio control state in response to actuation of the second physically actuated switch.

In one embodiment, the second remote unit comprises a second status indicator; the first remote unit is configured to cause the first status indicator to indicate the state of the main unit; and the second remote unit is configured to cause the first status indicator to indicate the state of the main unit.

In one embodiment, the first physically actuated switch is a foot actuated switch.

In one embodiment, the first physically actuated switch is a hand actuated switch.

BRIEF DESCRIPTION OF THE DRAWINGS

These and other features and advantages of the present invention will become appreciated as the same become better understood with reference to the specification, claims and appended drawings wherein:

DETAILED DESCRIPTION

The detailed description set forth below in connection with the appended drawings is intended as a description of exemplary embodiments of a system for wireless switching of effects pedals with status updates, and for selection of effects patches, provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
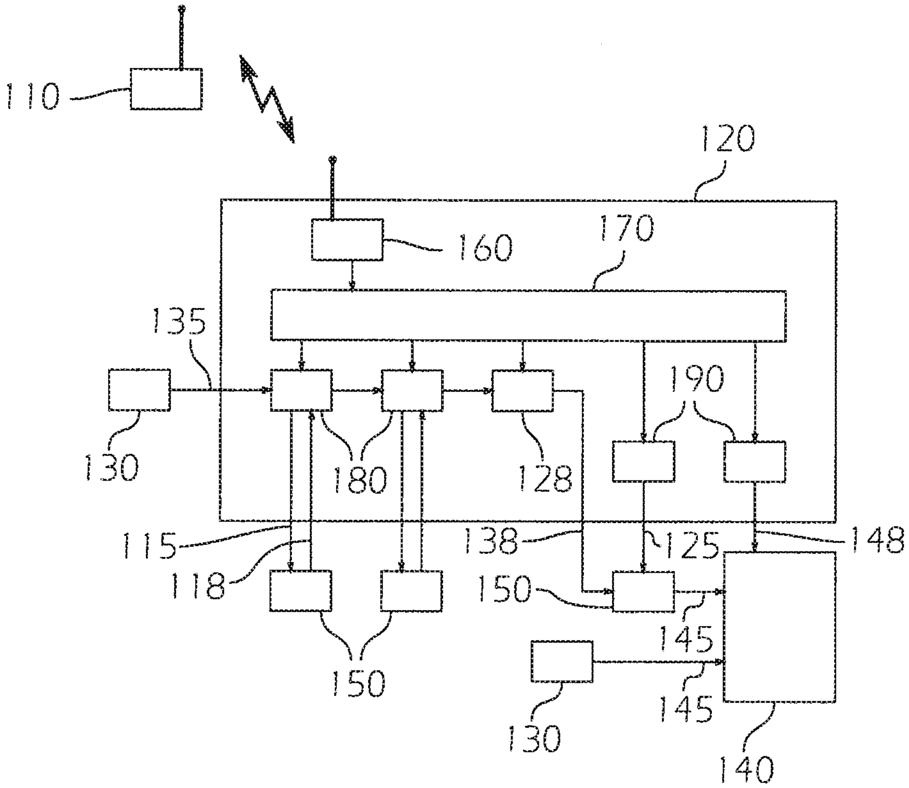
FIG. 1 is a block diagram of a system for wireless switching of audio signals according to an embodiment of the present invention.

Referring to FIG. 1, in one embodiment a system for wireless switching of audio signals includes a remote unit 110, a main unit 120, one or more audio sources 130, one or more effects pedals 150, and an audio amplifier 140. The main unit 120 may include a main unit transceiver 160, a main unit controller 170, one or more audio signal routing blocks 180, one or more control blocks 190, and a mute block 128. In operation, the audio signal from an audio source 130 propagates into the main unit audio input 135. Inside the main unit 120, the main unit controller 170 controls the states of the audio signal routing blocks 180, controlling the path and processing of the audio signal as it propagates through the main unit 120 to the main unit audio output 138. From the main unit audio output 138, the signal propagates to an effects pedal 150 and to an audio amplifier 140. The audio amplifier 140 may have an electrical output suitable for driving speakers, or it may have built-in speakers so that it may output acoustic power. An audio source 130 may be a musical instrument such as an electric guitar, for example, or the output of a preamplifier.

The main unit 120 may have an effects send output 115 and a corresponding effects return input 118 for each of the audio signal routing blocks 180. In operation, one or more audio effects pedals 150 may be connected between an effects send output 115 and the corresponding effects return input 118, forming an effects loop. The audio signal routing block 180 is capable of operating in one of two states (audio control states), i.e., a bypass state and a loop active state. When the audio signal routing block 180 is in the bypass state, the audio signal propagates directly from the audio input to the output of the audio signal routing block 180; when the audio signal routing block 180 is in the loop active state, it routes the audio signal out of the effects send output 115 and back in through the corresponding effects return input 118.

Figure 2A:
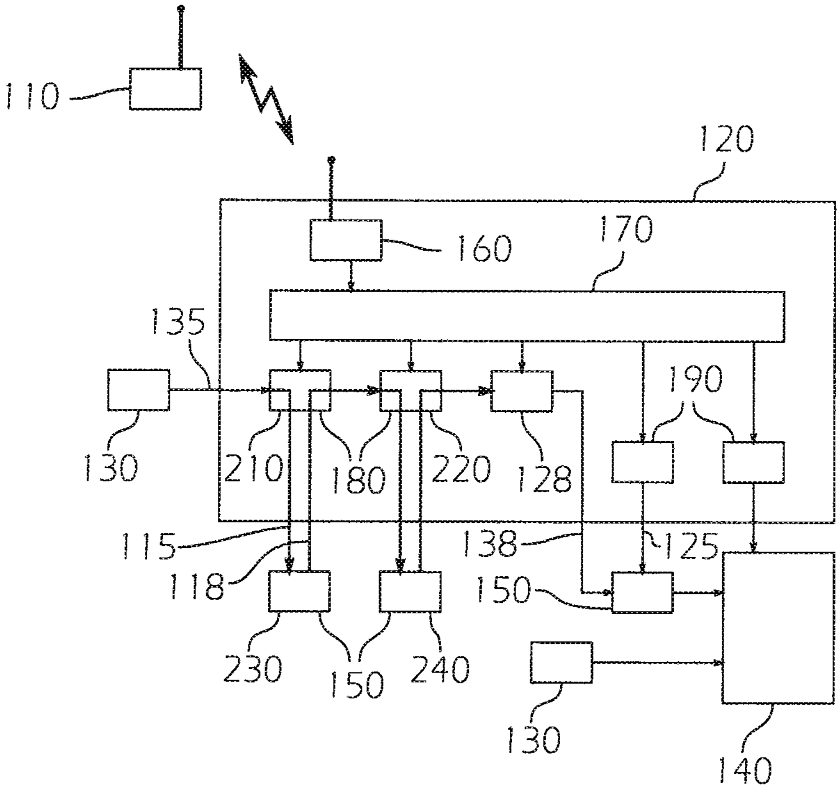
FIG. 2A is a block diagram of a system for wireless switching of audio signals, with two audio signal routing blocks in the loop active state, according to an embodiment of the present invention.

For example, referring to FIG. 2A, in an exemplary embodiment having two audio signal routing blocks 180, the audio signal may travel from the first audio signal source into the main unit audio input 135, and into the audio input of the first audio signal routing block 210. In one state, illustrated in FIG. 2A, in which both audio signal routing blocks 180 are in their respective loop active states, the audio signal may be routed, by the first audio signal routing block 210, through a first effects pedal 230 connected to the first effects send output 115 and the first effects return input 118 respectively. The second audio signal routing block 220 may then route the signal through a second effects pedal 240. In such a state each effects pedal 150 may add an effect, i.e., modify the audio signal passing through it. Commonly available effects pedals 150 may also include foot switches for enabling or disabling the effect. In this case, the musician has two ways of switching a given effect off: either by using the foot switch on the effects pedal 150, or by commanding the main unit 120 to place an audio signal routing block 180 into the bypass state, so as not to route the audio signal through the effects pedal 150. The effects pedal 150 will add its effect to the sound only when it has been turned on by its foot switch and when it is switched into the audio path by the corresponding audio signal routing block 180, i.e., when the audio signal routing block 180 is in the loop active state.

Figure 2B:
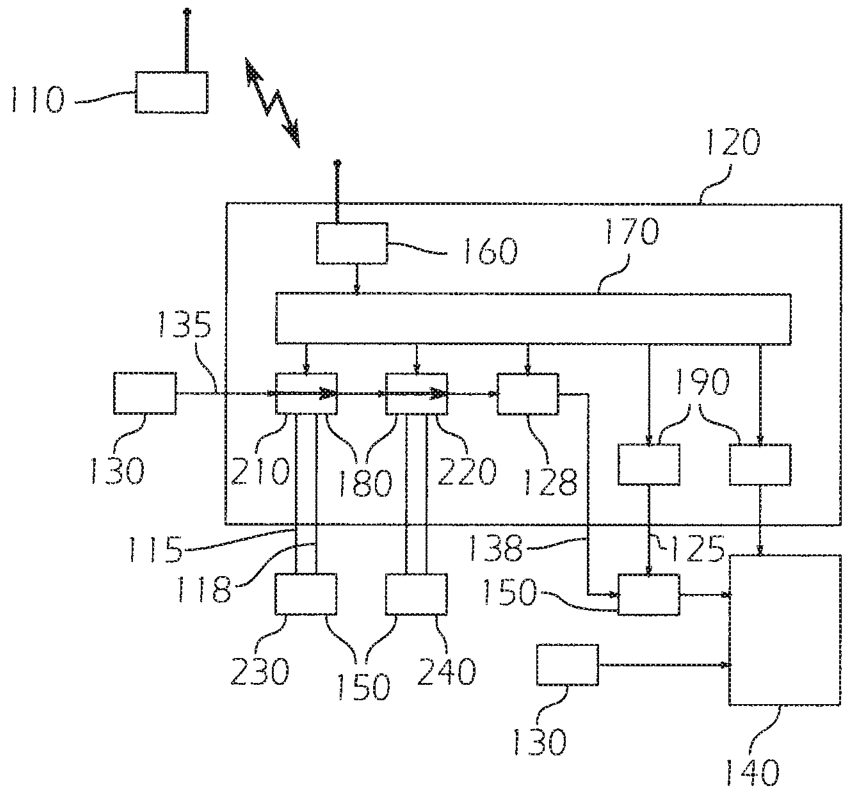
FIG. 2B is a block diagram of a system for wireless switching of audio signals, with two audio signal routing blocks in the bypass state, according to an embodiment of the present invention.

Referring to FIG. 2B, in another state both audio signal routing blocks 180 may be in their respective bypass states, as a result of which the audio signal may not be looped through either effects pedal 150, and neither effect will be added to the audio signal.

Referring again to FIG. 1, the main unit 120 may also include one or more control outputs 125 connected to control blocks 190. In one embodiment, the control output 125 may present a high output impedance in a first state and a short to ground in a second state. An effects pedal 150 configured to accept a remote control input may be connected to one of the control outputs 125, and whether it adds the effect may then be controlled through this connection. Similarly, an audio amplifier 140 may have an internal A/B switch configured to be remotely controlled via the audio amplifier control input 148. This control input may also be connected to one of the control outputs 125 of the main unit 120, as illustrated in FIG. 1. In this case, the audio amplifier 140 may have two audio amplifier signal inputs 145, and its output may correspond to the first or the second input depending on the setting of the audio amplifier's A/B switch.

Figure 3:
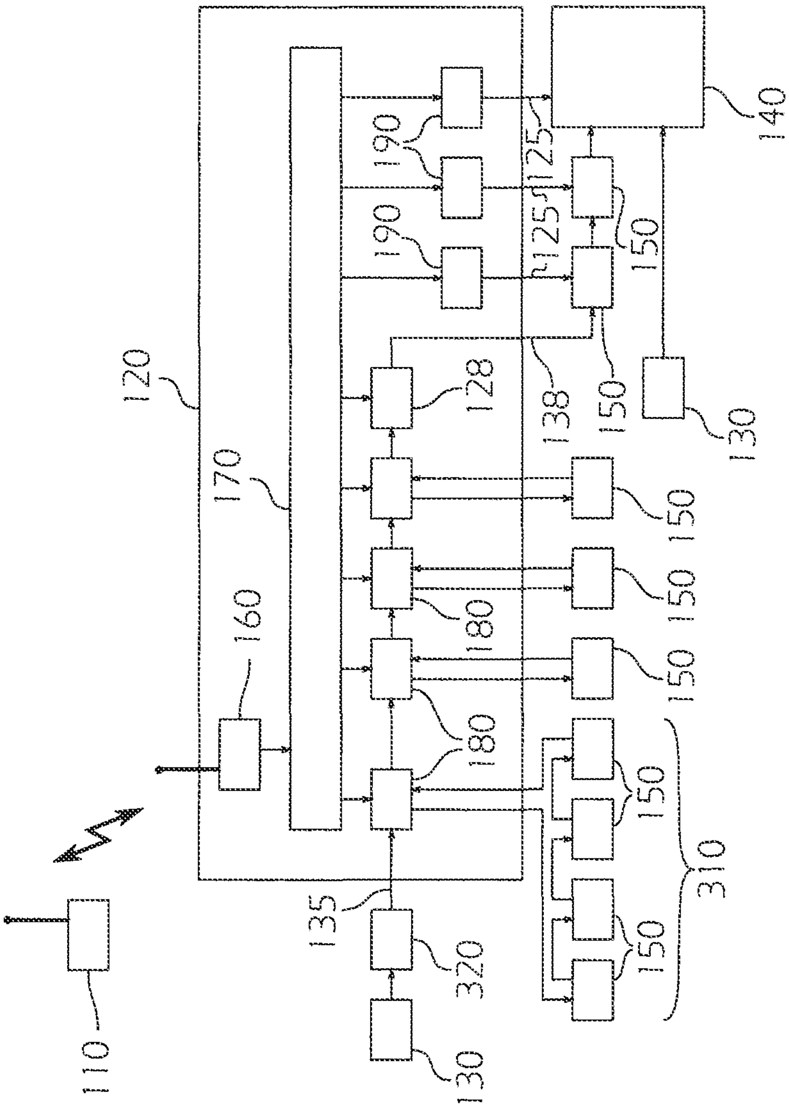
FIG. 3 is a block diagram of a system for wireless switching of audio signals according to another embodiment of the present invention.

Referring to FIG. 3, multiple suitable variations are possible on both the configuration of the main unit 120 and on its assembly with audio sources 130 and effects pedals 150. For example, there need not be two audio signal routing blocks 180 (as shown in FIG. 1), but there may be more, e.g., four, as illustrated in FIG. 3, or fewer. Similarly there may be more or fewer control blocks 190. Moreover, as shown in FIG. 3, the user may elect to set up grouped effects pedals 310, i.e., effects pedals 150 that are cascaded or ganged together. This may be accomplished as shown, for example, by cascading the effects pedals 150 and connecting them to a single effects send output 115 and back to the corresponding effects return input 118, so that when the corresponding audio signal routing block 180 is in the loop active state and routes the audio signal through that effects send output 115 and effects return input 118 (see FIGS. 4A and 4B), all of the grouped effects pedals 310 are simultaneously or concurrently switched into the audio signal path. The user may also set up autonomous effects pedals 320 by installing them before or after the main unit 120, so that their influence on the audio signal is independent of the state of the main unit 120.

Figure 4A:
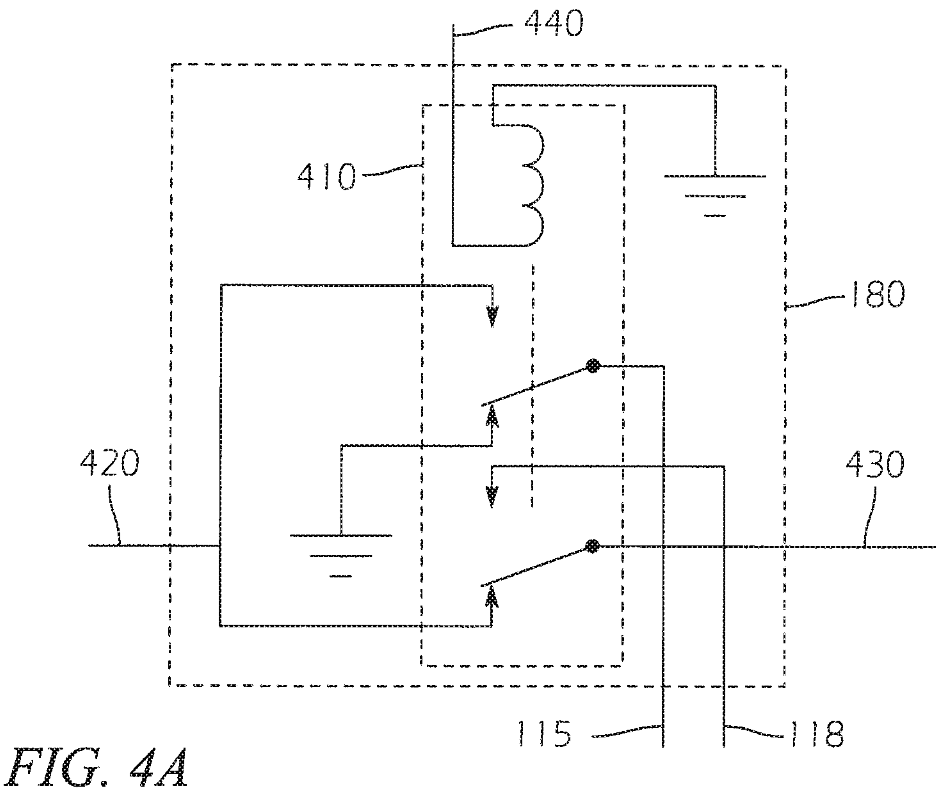
FIG. 4A is a schematic diagram of an audio signal routing block in the bypass state according to an embodiment of the present invention.
Figure 4B:
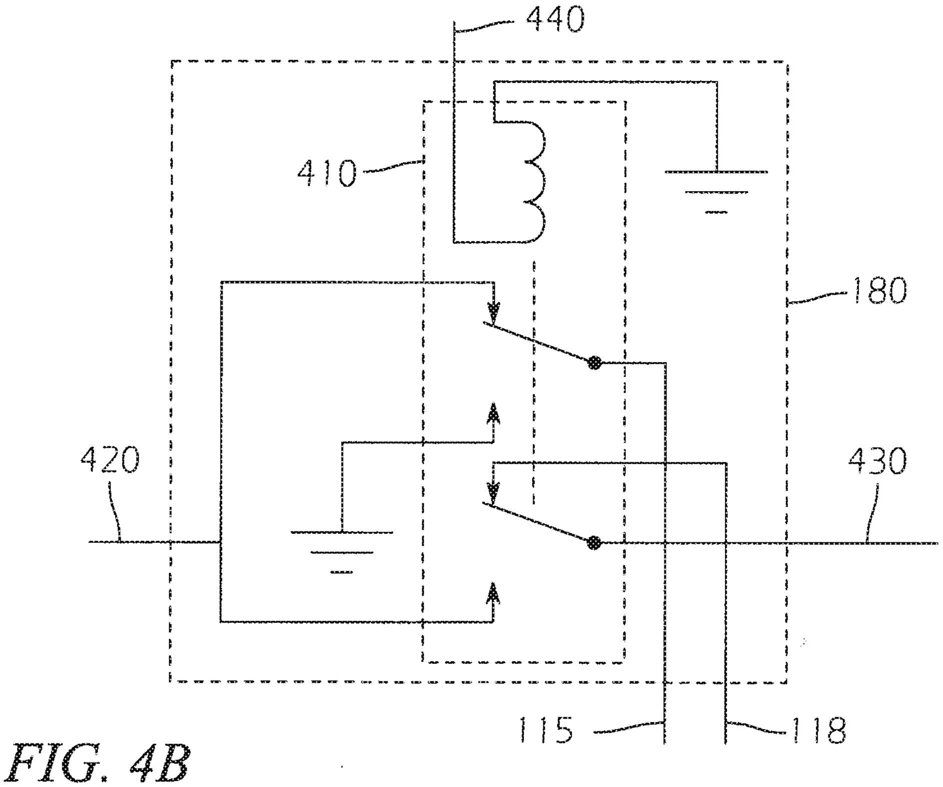
FIG. 4B is a schematic diagram of an audio signal routing block in the loop active state according to an embodiment of the present invention.

Referring to FIG. 4A, in one embodiment an audio signal routing block 180 may be built using a double-pole double-throw (DPDT) relay 410. When the relay 410 is de-energized, the audio signal routing block 180 may be in the bypass state shown in FIG. 4A, in which the audio signal propagates directly from the audio signal routing block audio input 420 to the audio signal routing block audio output 430. In the loop active state of FIG. 4B, the relay 410 is energized, as a result current, supplied by the main unit controller 170, flowing into the control input 440 of the audio signal routing block 180. In the loop active state the audio signal is diverted to the effects send output 115 and then returned into the audio signal path from the effects return input 118. Although the embodiment illustrated in FIGS. 4A and 4B represents one way to construct an audio signal routing block 180, the present invention is not limited thereto; the switching functions may also be accomplished using two single-pole double-throw (SPDT) relays, or using four single-pole single-throw (SPST) relays.

Figure 5A:
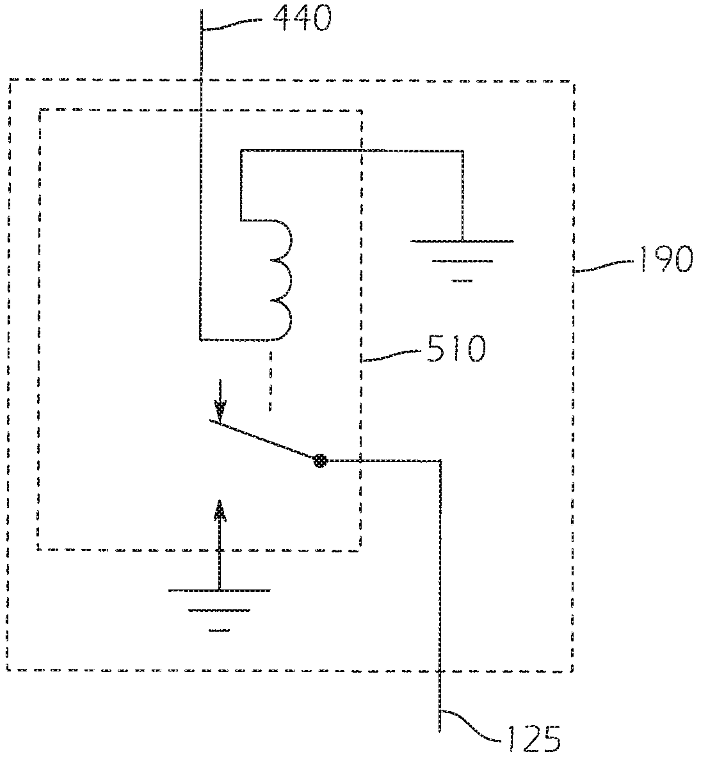
FIG. 5A is a schematic diagram of a control block in the open state according to an embodiment of the present invention.
Figure 5B:
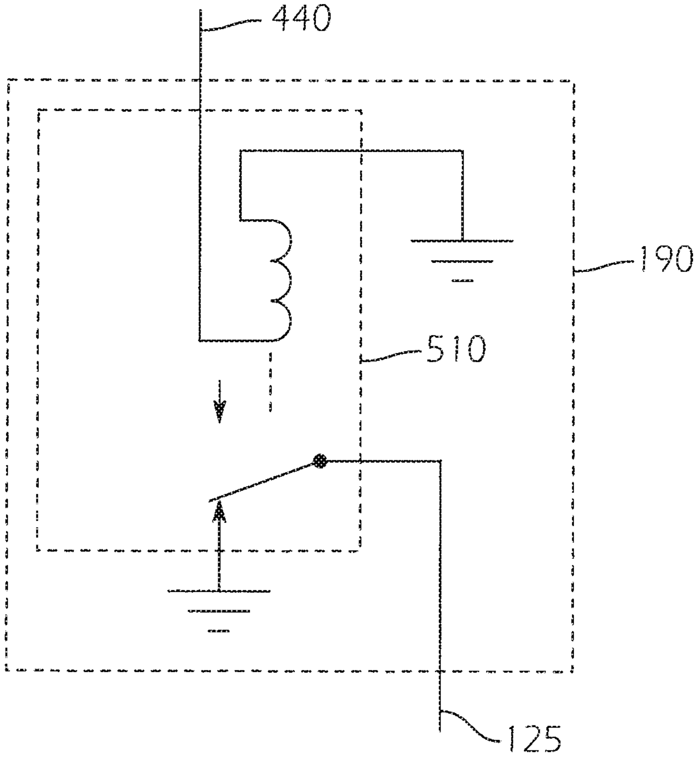
FIG. 5B is a schematic diagram of a control block in the grounded state according to an embodiment of the present invention.

Referring to FIG. 5A, a control block 190 may be implemented using an SPST relay 510 as illustrated. In a first state, illustrated in FIG. 5A, the SPST relay 510 switch is open and the control output 125 is not connected. In a second state, illustrated in FIG. 5B, the SPST relay 510 switch is closed, and control output 125 is connected to ground. The control output 125 may then be used to control external equipment configured to be controlled by such a connection. Such external equipment may for example include equipment with a control input (FIG. 1) composed of a logic input with a pull-up resistor.

Figure 6A:
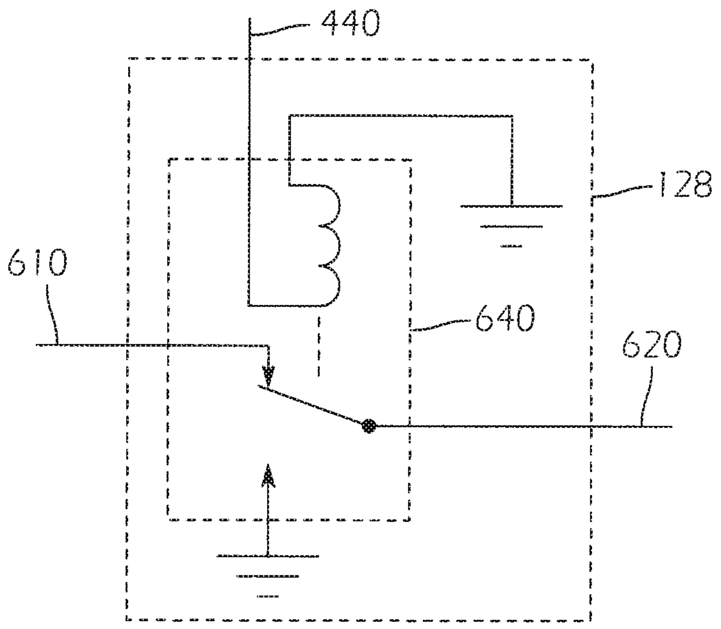
FIG. 6A is a schematic diagram of a mute block in the un-muted state according to an embodiment of the present invention.
Figure 6B:
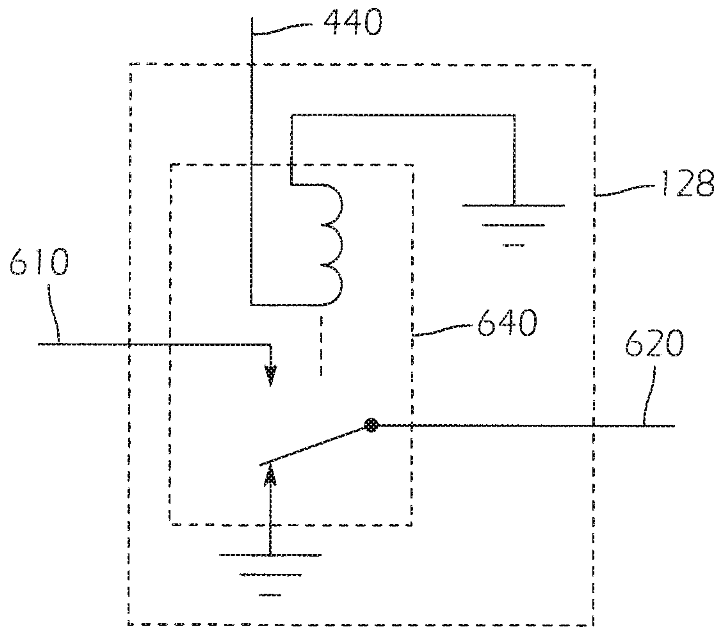
FIG. 6B is a schematic diagram of a mute block in the muted state according to an embodiment of the present invention.

Referring to FIG. 6A, a mute block 128 may be implemented with an SPDT relay 640 which in the un-muted state is shown to route the mute block audio input 610 through to the mute block audio output 620. In the muted state, illustrated in FIG. 6B, the SPDT relay 640 disconnects the mute block audio input 610 and grounds the mute block audio output 620.

In one embodiment, the main unit 120 is configured to be fail-safe, i.e., configured so that if power to the main unit 120 is lost, audio is still transmitted, bypassing any effects connected to the send connectors and return connectors. This may be accomplished by selecting the normally closed positions of the relays to transmit the audio signal through each block. For example, the audio signal routing blocks 180 may be configured so that the bypass mode is the mode for which the relay is de-energized. Moreover, the mute block 128 may be configured so that it is in the un-muted state when the SPDT relay 640 is de-energized.

In one embodiment, the main unit controller 170 receives a signal from the main unit transceiver 160 whenever a physically actuated switch is activated on the remote unit 110. The physically actuated switch may be any of a variety of modes of switches actuated by any human action including without limitation hand actuated switches, foot actuated switches and less common varieties such as a switch worn on the head and actuated by nodding of the head. It may be, for example, a momentary contact switch, a maintained contact switch, an alternate action switch, a push button switch, a toggle switch, a finger-actuated switch or a foot switch, or combinations of the above such as a momentary contact foot switch. The wireless signals sent by the remote unit 110, received by the main unit transceiver 160, and relayed to the main unit controller 170 may affect the state of the main unit controller 170, and, thereby, the state of the main unit 120, in several ways.

In one embodiment, three modes of response to actuation of a physically actuated switch are provided, referred to as toggle mode, latch mode, and momentary mode. Momentary mode may also be referred to as tap mode, and latch mode may also be referred to as patch mode. The effect of each physically actuated switch in the remote unit 110 may be selected by setting a corresponding configuration switch, which may be a three-position dual inline package (DIP) switch, with the three positions corresponding to toggle mode, latch mode, and momentary mode. For example the remote unit 110 may have four momentary contact switches, which may also be referred to as buttons, corresponding to four effects channels in the main unit, and each button may operate independently in toggle mode, in which each time the button for a channel is pressed, the corresponding channel toggles between its two states. For example, channel 1 may correspond to the first audio signal routing block 210 in the main unit 120, and if initially it is in bypass mode, then pressing button 1 on the remote unit 110 will cause the first audio signal routing block 210 to transition to the loop active state. When the first audio signal routing block 210 is in the loop active state, pressing button 1 on the remote unit 110 will cause the first audio signal routing block 210 to transition to the bypass state. If several buttons are set, according to their respective configuration switches, to latch mode, then pressing any of these buttons activates the corresponding channel in the main unit 120, e.g., sets it to the loop active state, and deactivates the channels corresponding to the other buttons set to latch mode, e.g., sets each of them to the bypass state. If a button is set to momentary mode, the channel is on, e.g., in its loop active state, only while the corresponding switch on the remote unit 110 is activated.

These configuration options may be combined in various suitable ways. For example, three channels may be configured to be operating together in latch mode, while a fourth channel is in toggle mode, and a fifth in momentary mode. Each of these channels may correspond to an audio signal routing block 180, a control block 190, or a mute block 128.

Figure 7:
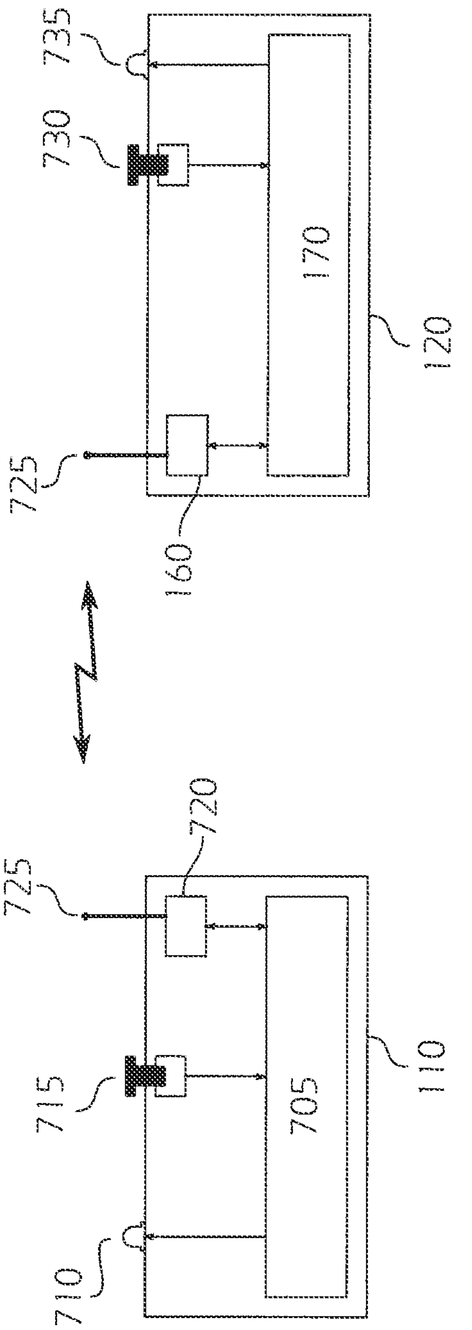
FIG. 7 is a block diagram of a system for wireless switching of audio signals, illustrating internal components of a remote unit, according to an embodiment of the present invention.

Referring to FIG. 7, the remote unit 110 may include a remote unit controller 705 and a remote unit transceiver 720, and data transmitted from the remote unit transceiver to the main unit transceiver 160 may be transmitted in packets, with each packet containing a security code. The remote unit transceiver 720 and the main unit transceiver 160 may each be equipped with an antenna 725 to improve the range over which they are able to communicate. The security code may be unique to the remote unit transceiver 720. This uniqueness may be insured during the manufacturing process, when the remote unit transceiver 720 is fabricated, for example, or when the remote unit transceiver 720 is configured and integrated into the remote unit 110. In one embodiment, the security code may be of sufficient length, in bits, to provide 4.2 billion different possible security codes.

The main unit 120 may be configured to accept data transmissions containing certain security codes and to ignore all other data transmissions. These methods may help to avoid interference from other sources of electromagnetic energy transmitted at the same or nearby frequencies. Such other sources may include broadband sources such as machinery or even lightning, or narrowband sources such as other wireless transmitters employed in other applications or a remote unit 110 constructed according to an embodiment of the present invention, operated by another user nearby. Configuring the main unit to accept data transmissions containing certain security codes, and to ignore all other data transmissions, may be accomplished using a pairing process, which may also be referred to as a learn, or learning, process, for which the main unit 120 may be equipped with a learn button 730. To pair the main unit 120 with a remote unit 110, i.e., to teach the main unit 120 to accept input from the remote unit 110, the user may first remove the antenna 725 from each unit, place the remote unit 110 near the main unit 120, and press and hold the learn button 730 on the main unit 120, thereby maintaining the main unit 120 in a learn state while the learn button 730 is held. The user may then actuate the physically actuated switch 715 on the remote unit 110, while continuing to hold the learn button 730 on the main unit 120. The remote unit 110 will transmit its security code each time the physically actuated switch 715 is actuated, and the main unit controller 170 will, while the learn button 730 is pressed, i.e., while it is in the learn state, store in nonvolatile memory any security codes it receives. Thus, this process will cause the main unit 120 to store the security code of the remote unit 110. Upon storing a security code, the main unit 120 may flash the main unit status indicator 735 to indicate to the user that the main unit 120 has learned the security code of the remote unit 110. Subsequently, the main unit 120 will accept data transmissions containing the stored security code. A mechanism may be provided allowing the user to clear all stored security codes from the main unit's nonvolatile memory, e.g., by pressing another button provided for this purpose on the main unit 120, by pressing a combination or sequence of buttons, or by pressing and holding a button, or combination of buttons, for an extended time. The main unit 120 may also have LEDs or other status indicators indicating the current state of each channel in the main unit 120, which may be helpful if a user is able to see the main unit 120 and is sufficiently close to be able to discern the main unit status indicators.

In one embodiment, the remote unit 110 has a remote unit channel status indicator 710 for each physically actuated switch 715. In operation, the main unit 120 sends state update information to the remote unit 110 each time the state of a channel is changed, and the remote unit 110 displays the current state of the channel using the remote unit channel status indicator 710. For example, the remote unit channel status indicator 710 may be a light emitting diode (LED); and the remote unit 110 may illuminate the LED corresponding to a channel when the channel is in the loop active state, and extinguish the LED when the channel is in the bypass state. The main unit 120 may also transmit information on its current state periodically, when the state of the main unit 120 has not changed for some period of time. In one embodiment, the main unit 120 transmits information about its current state every 10 seconds, when its state is unchanged.

More than one remote unit 110 may be used concurrently or simultaneously with one main unit 120. For example, a musician may wish to be able to control effects from either stage left or stage right. In this case, the main unit 120 may be paired with two remote units 110, and the remote units 110 may be positioned as desired. In operation, the main unit 120 may operate with each channel in the state corresponding to the input most recently received, for that channel, from a remote unit 110 paired with the main unit 120. As in the case when the main unit is operated with a single remote unit, the main unit transmits information about its state, when its state changes and also periodically when the state is unchanged. The main unit transmits this state information to all remote units. As a result, in a configuration with a first remote unit and a second remote unit, when a user actuates a physically actuated switch on the first remote unit, causing a state change in the main unit, the main unit will transmit the new state information to both remote units, and both remote units will display the new main unit state.

Several main units 120 may be combined in one enclosure to save space and to share certain functions or components, such as a power supply, and a learn button 730. One or more main units 120 in an enclosure may be referred to as a main unit box. Each remote unit 110 may have a user-settable main unit select switch to allow it to communicate only with one of the main units 120 in the main unit box. For example, a main unit box may contain four main units 120, and the user may have four remote units 110, on which the main unit select switches are set to 1, 2, 3, and 4, respectively, to associate each with a respective main unit 120 in the main unit box. In one embodiment the main unit select switches are DIP switches, and the main units 120 are configured at the time of manufacture, with a main unit number, which, in the example above would range from 1 to 4.

The main unit controller 170 and the remote unit controller 705 may each include one or more processors executing computer program instructions and interacting with other system components for performing the various suitable functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like.

The system may include provisions for debouncing the physically actuated switches 715 in the remote unit 110. Such switches may, especially when transitioning from the a non-conducting state to a conducting state, transition multiple times between conducting current and not conducting current in a short time, as the mechanical contacts bounce against each other and then come to rest. Especially when the effect of making and breaking the connection is to toggle the state of part of the system, switch bounce is undesirable as the random number of bounces may result in an unpredictable final state. Debouncing methods include implementing, in software or hardware, provision for ignoring changes in the switch state until it has been in a new state for some interval, which may be referred to as the debounce delay.

A provision for debouncing, which may be referred to as a debounce circuit, may be implemented in the remote unit 110. In one embodiment, the debounce delay may be chosen to be long enough to reliably prevent switch bounce from triggering undesirable state transitions while also being short enough to avoid undesirable response delays. In one embodiment, the debounce delay may be 20 milliseconds (ms).

Debouncing measures may be employed in the main unit transceiver 160, where a debounce delay, during which the main unit transceiver 160 monitors the received signal to verify that it consistently contains the correct code, may be used to prevent or protect from undesired state transitions that otherwise could be caused by interfering signals. In such an embodiment, the delay may be referred to as a debounce delay because, although it does not primarily mitigate the effects of physical switch bounce, it aids in preventing or protecting from undesired state transitions. As used herein, the term debounce circuit refers to any provision for providing debounce, whether implemented in hardware or in software or in a combination of hardware and software. In one embodiment, the debounce delay in the receiver is 20 ms.

Figure 8:
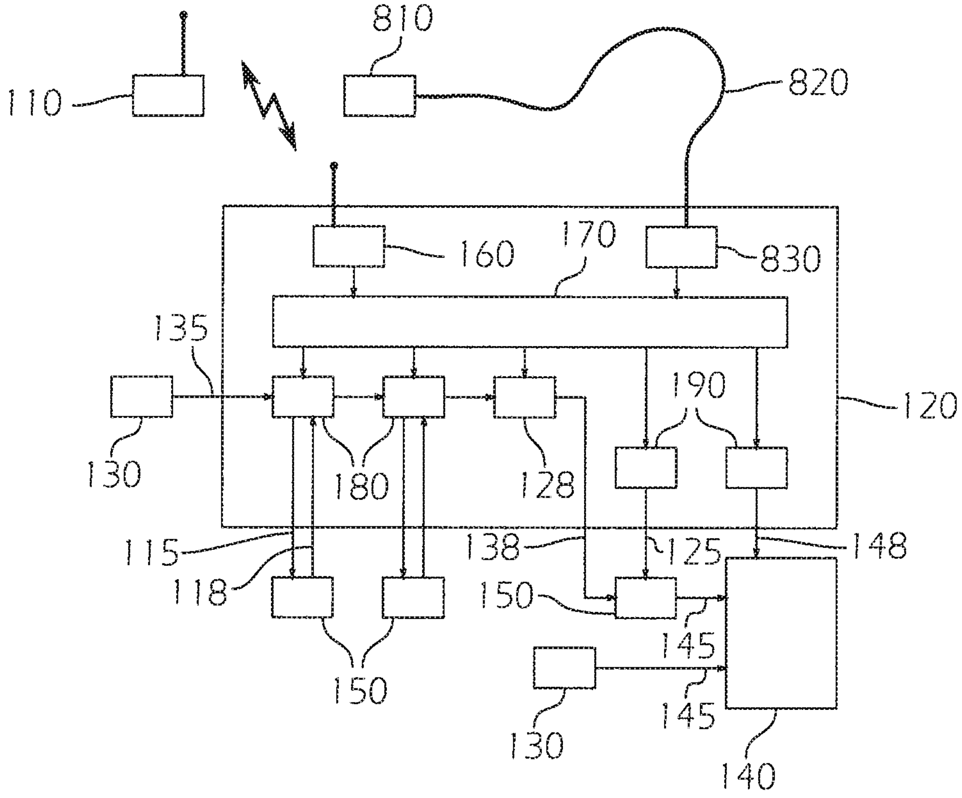
FIG. 8 is a block diagram of a system for wireless or remote switching of audio signals according to another embodiment of the present invention.

Referring to FIG. 8, a wired control link may in one embodiment be provided to serve as a backup in the event of a fault in the wireless link. This wired control link may comprise a wired remote unit 810 comprising a physically actuated switch, which may be any of a variety of modes of switches actuated by any human action, including without limitation a hand-actuated or foot-actuated switch. The may be connected by a cable 820 to a remote control interface 830 in the main unit 120. The wired remote unit 810 may communicate with the remote control interface 830 using a suitable wired communications protocol. The main unit controller 170 in the main unit 120 may energize or de-energize relays in response to actuation of the physically actuated switch on the wired remote unit 810 in the same manner as it would in response to actuation of a corresponding switch on the wireless remote unit 110. The cable 820 and the wired communications protocol connecting the wired remote unit 810 and the remote control interface 830 may operate according to any suitable standard, including without limitation Musical Instrument Digital Interface (MIDI), or Universal Serial Bus (USB), or according to a purpose-designed or otherwise non-standard protocol.

Figure 9A:
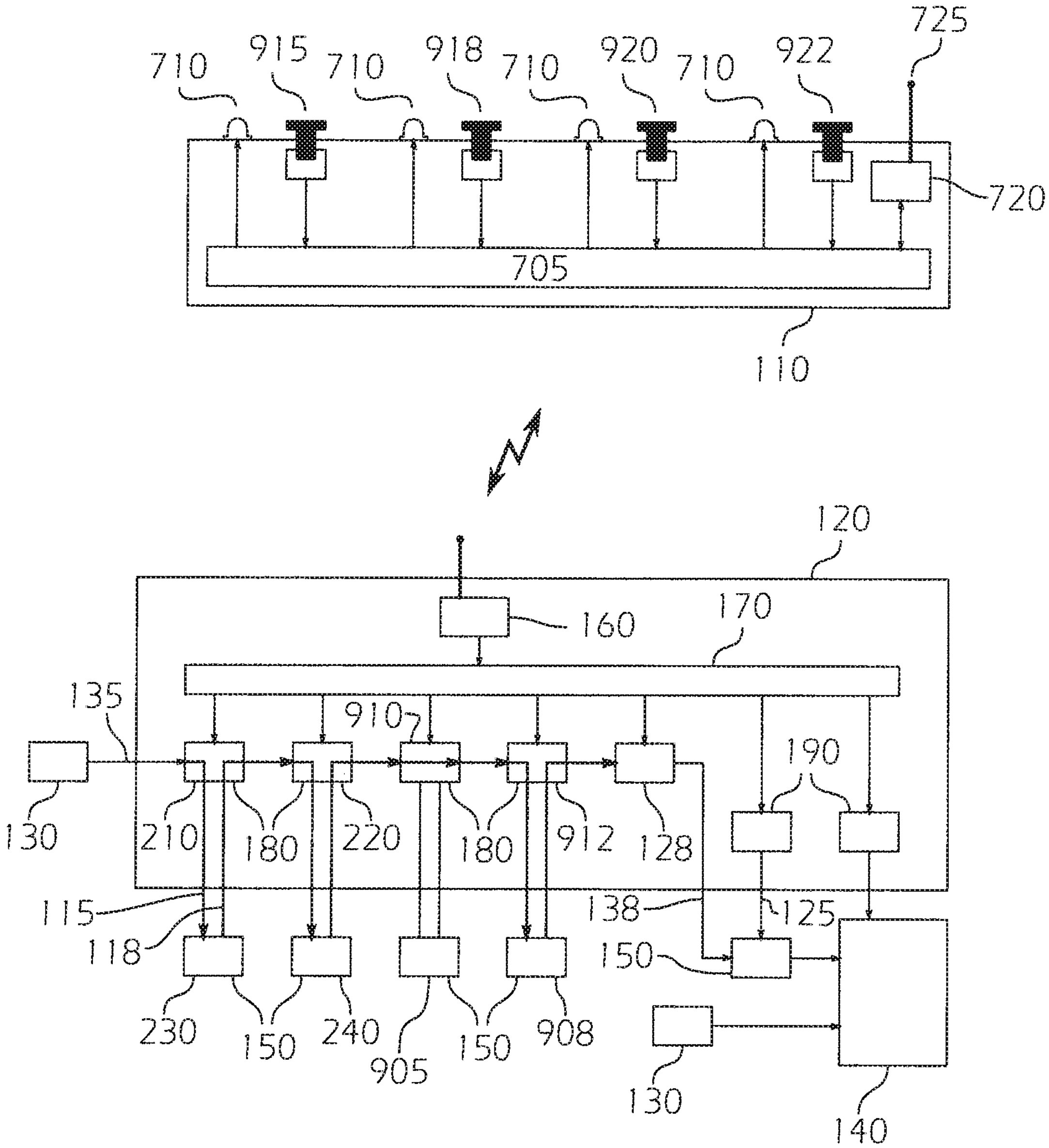
FIG. 9A is a block diagram of a system for wireless switching of audio signals in a first effects patch state according to an embodiment of the present invention.
Figure 9B:
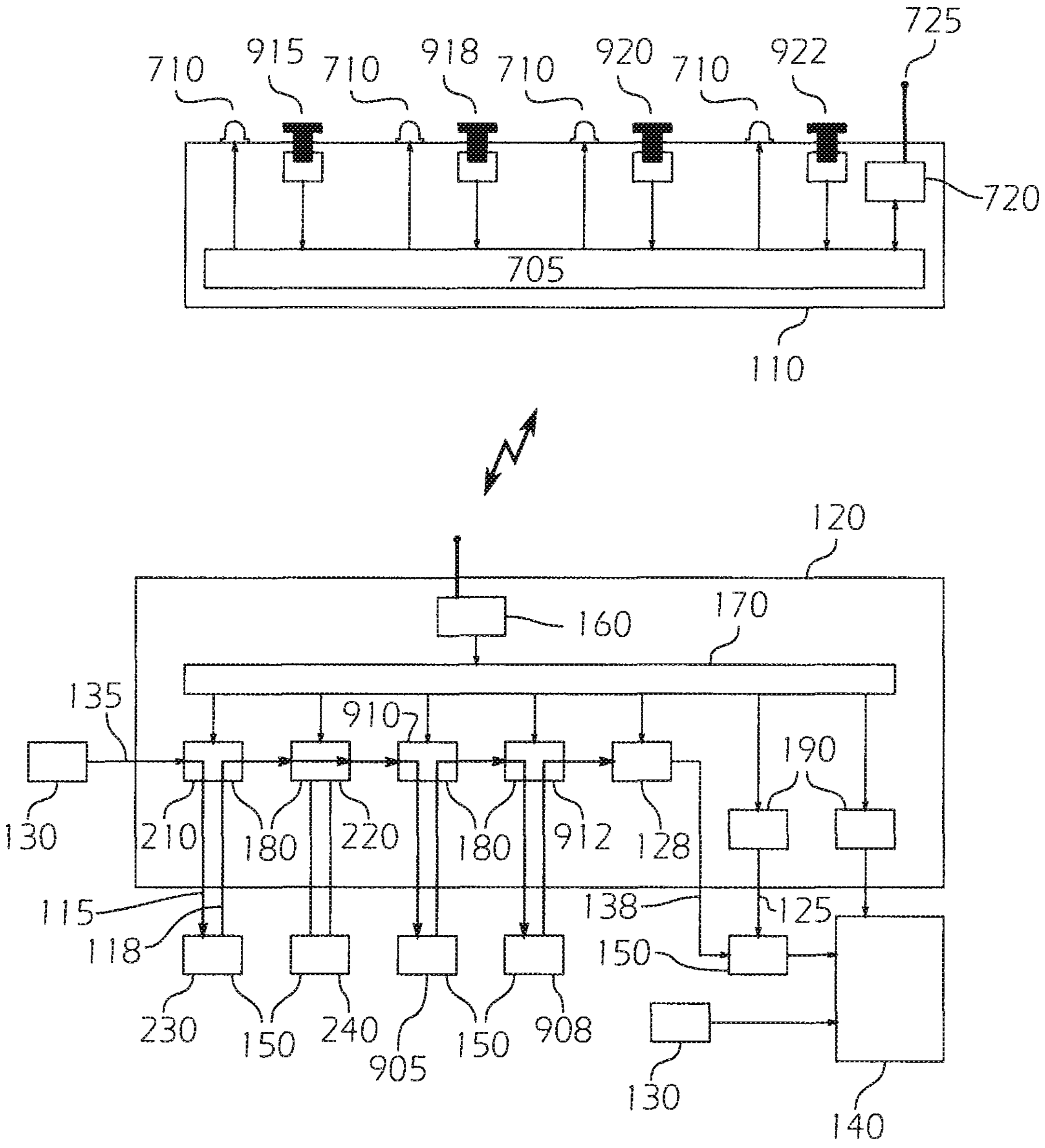
FIG. 9B is a block diagram of a system for wireless switching of audio signals in a second effects patch state according to an embodiment of the present invention.

Referring to FIG. 9A, in one embodiment, the remote unit 110 may be configured to be programmable with effects patches, which may also be referred to as scenes. Each effects patch corresponds to a combination of a first subset of the channels in the main unit 120 being in the loop active state and a second subset of the channels in the main unit 120 being in the bypass state. For example, a musician may install four effects pedals 150, i.e., a first effects pedal 230, a second effects pedal 240, a third effects pedal 905, and a fourth effects pedal 908, on four respective channels of the main unit 120, using a first audio signal routing block 210, a second audio signal routing block 220, a third audio signal routing block 910, and a fourth audio signal routing block 912, respectively. The remote unit 110 may have, correspondingly, a first physically actuated switch 915, a second physically actuated switch 918, a third physically actuated switch 920, and a fourth physically actuated switch 922. In a first effects patch, the musician may want to activate the first effects pedal 230, the second effects pedal 240, and the fourth effects pedal 908. Referring to FIG. 9B, the musician may want to activate, in a second effects patch, the first effects pedal 230, the third effects pedal 905, and the fourth effects pedal 908.

It may be advantageous for the musician to be able to switch between one effects patch and another with the actuation of a single physically actuated switch, instead of being required to actuate a first set of physically actuated switches to cause a first set of channels to transition to the loop active state, and a second set of physically actuated switches to cause a second set of channels to transition to the bypass state. In one embodiment, this is accomplished by programming the remote unit controller 705, which may include non-volatile memory, with a list of channels for each effects patch, the list identifying the channels to be in the loop active state when the effects patch is selected. Once the remote unit 110 has been programmed in this manner, a physically actuated switch on the remote unit 110 for which an effects patch has been defined will activate the effects patch when actuated, i.e., it will send data packets to the main unit transceiver 160 causing a subset of the channels to be in the loop active state, and a subset of the channels to be in the bypass state.

In one embodiment, the effects patches are programmed using buttons on the remote unit 110. The remote unit includes a remote unit power button, and two remote unit status indicators, which may be a red LED and a green LED. During the programming process the remote unit 110 provides signals to acknowledge user input. A user first sets the response type, for all of the remote unit physically actuated switches that are to be part of the effects patch group, to latch mode. The user then turns on the remote unit, and presses a specific combination of buttons, e.g., the user may press and hold the power button for at least ten seconds, which causes the remote unit 110 to transition into an effects patch programming mode. The red and green LEDs are illuminated during the first 10 seconds, and then extinguished. Continuing to hold the power button for another 20 seconds, for a total of 30 seconds, results in clearing all of the effects patch definitions in the remote unit; this is signaled by rapid flashing of both LEDs until the power button is released, and the remote unit powers down. In effects patch programming mode, the user may select an effects patch, by first pressing the remote unit button which identifies the effects patch. If this effects patch has been programmed in the past, then the channels which are already part of the effects patch are indicated by the corresponding remote unit channel status indicators 710 being illuminated solid. The user then presses, one at a time, buttons corresponding to main unit channels to be added to the effects patch, i.e., which are to be in the loop active state when the effects patch is activated, or to be removed from the effects patch. The buttons, e.g., 915, 918, 920, 922, operate in a toggle mode. If the user inadvertently presses a button not corresponding to a channel to be added to the effects patch, the user may press the same button again, to remove the channel from the effects patch. If the effects patch had previously been programmed to include a channel no longer desired, the user may similarly press the corresponding button to remove the channel from the effects patch. Each such button press is acknowledged by the remote unit 110 which illuminates or extinguishes the corresponding remote unit channel status indicator 710 to show whether or not the channel is part of the effects patch. If the user attempts to add to the effects patch a channel not set to latch mode, the main unit flashes the red LED three times. When all of the channels are set as desired, the user presses the remote power button to commit the programming of the effects patch, and the remote unit exits effects patch programming mode and returns to normal operation.

In particular, to program the effects patch illustrated in FIG. 9A, the user may first set the configuration switches for the first physically actuated switch 915, the second physically actuated switch 918, the third physically actuated switch 920, and the fourth physically actuated switch 922 so that all four of these physically actuated switches are in latch mode. Next, the user may press and hold the first physically actuated switch 915 and the second physically actuated switch 918 on the remote unit 110 simultaneously for five seconds, to put the remote unit 110 into effects patch programming mode, and then press the first physically actuated switch 915, to instruct the remote unit 110 that the first effects patch is being programmed. The user may then press the first physically actuated switch 915, the second physically actuated switch 918, and the fourth physically actuated switch 922, to program the first effects patch to have these three channels active, e.g., in the loop active state, and to have the third channel, i.e., the channel, in the main unit 120, corresponding to the third physically actuated switch 920, inactive, e.g., in the bypass state. Finally the user may press the power button to commit the programming of this effects patch.

This process may be repeated for other effects patches. All of the effects patch definitions may be cleared using another button combination, e.g., by pressing the first and third buttons on the remote unit 110 simultaneously for at least five seconds; the remote unit 110 may respond to a clear command by clearing the effects patch definitions from memory and flashing a remote unit channel status indicator 710, or another indicator such as the red LED, twice.

In one embodiment, the main unit 120 treats all requests from a remote unit 110, whether or not the remote unit is programmed with effects patches, as requests to activate or deactivate main unit channels. Consequently, when several remote units 110, not all of which have been programmed with the same effects patch definitions, are used with the same main unit 120, a remote unit 110 sending a command which conflicts with a currently active effects patch may cause that effects patch to be disabled, in order to implement the request from the remote unit 110. For example, if a first remote unit 110 has activated effects patch 1, e.g., an effects patch defined for the first physically actuated switch of the first remote unit, and a user activates the first physically actuated switch on a second remote unit, which has a first physically actuated switch set to momentary, the main unit 120 may cancel effects patch 1, and enable channel 1 for as long as the first physically actuated switch on the second remote unit is activated. To again activate effects patch 1, the user may subsequently press the first physically actuated switch on the first remote unit.

Similarly, each remote unit channel status indicator 710 displays the current state of the corresponding channel in the main unit, i.e., loop active or bypass, or more generally, active or inactive, without regard to whether the channel state is the result of an effects patch having been selected in one of the remote units. In one embodiment, the channel status indicators 710 are blue LEDs, and an additional set of LEDs, e.g., orange LEDs, which may be referred to as effects patch status indicators, are provided in each remote unit, one for each physically actuated switch, to indicate which effects patch, if any, is currently active. The remote unit includes, in this case, in each data packet sent to the main unit, along with instructions as to which main unit channels to make active or inactive, an indication of which effects patch is selected. The main unit 120 echoes this latter indication back to all remote units, so that each remote unit displays the same effects patch selection information on its orange LEDs. For example, if the user selects effects patch 2 on a first remote unit, the orange LED at the position of the second physically actuated switch will illuminate on the first remote unit and on any other remote unit interacting with the main unit.

A remote unit programmed with effects patches may, in operation, when switching to a different effects patch, send two sets of instructions to the main unit 120. The first set may instruct the main unit 120 to deactivate (e.g., set to bypass mode) all channels that are configured, in the remote unit, to be in patch mode. The second set may instruct the main unit 120 to then activate all of the channels which are part of the currently selected effects patch. This sequence insures that any channels which are active prior to the sending of the first set of instructions, as a result, for example, of instructions sent from another remote unit, are not left active even though they are not part of the currently selected effects patch.

In one embodiment, a main unit 120 may respond to data packets sent from a remote unit 110, or to a change to a particular state, by sending out a sequence of commands, via a Musical Instrument Digital Interface (MIDI), or other serial interface. For example, the main unit 120 may send out a sequence of commands whenever a particular channel is activated, or whenever a particular combination of channels becomes simultaneously active, as a result of one or more previously inactive channels becoming active. A MIDI-compatible main unit 120 may have MIDI input, output, and through connectors. In one embodiment, a main unit 120 may accept instructions to activate or deactivate any channel, or any combination of channels, via a MIDI or other serial interface. In such an embodiment, a first main unit capable of sending out a sequence of commands may be connected to a second main unit configured to accept instructions via a serial interface; the second main unit may then be slaved to the first main unit, giving the first main unit effective control over a larger number of channels.

Although limited embodiments of the system for wireless switching of audio signals have been specifically described and illustrated herein, many modifications and variations will be apparent to those skilled in the art. For example effects patch definitions may in one embodiment, be programmed into, and stored in, a main unit instead of a remote unit.

Moreover, although several examples in this disclosure are directed to audio signal routing block, the embodiments illustrated by these examples are not limited thereto, and similar examples may be constructed with, or with combinations of, control blocks, audio signal routing blocks, or a mute block. Accordingly, it is to be understood that the system for wireless switching of audio signals constructed according to principles of this invention may be embodied other than as specifically described herein. The invention is also defined in the following claims, and equivalents thereof.

What is claimed is:

1. A system for wireless control of audio signal switching, the system comprising:

a first remote unit, the first remote unit comprising:

a first wireless transceiver;

a first physically actuated switch coupled to the first wireless transceiver; and a first status indicator coupled to the first wireless transceiver; and a main unit, the main unit comprising:

a second wireless transceiver;

an audio input;

an effects send output;

an effects return input; and an audio output;

wherein:

the first wireless transceiver is configured to transmit data packets to the second wireless transceiver, and the second wireless transceiver is configured to transmit data packets to the first wireless transceiver;

the first remote unit is configured to change the state of the status indicator in response to data packets transmitted to the first wireless transceiver by the second wireless transceiver; and the main unit is configured to operate alternately in a first audio control state or in a second audio control state, and to transition between the first audio control state and the second audio control state in response to actuation of the first physically actuated switch, the main unit being configured to route an audio signal from the audio input directly to the audio output when operating in the first audio control state, and the main unit being configured to route an audio signal from the audio input to the effects send output, and to route an audio signal from the effects return input to the audio output when operating in the second audio control state.

2. The system of claim 1, wherein:

the first remote unit is permanently configured with a unique security code; and the first wireless transceiver is configured to transmit data packets comprising the unique security code to the second wireless transceiver.

3. The system of claim 2, wherein the first remote unit is configured to be configurable with any of 4.2 billion possible security codes.

4. The system of claim 2, wherein the main unit is configured to transition, upon receipt of appropriate user input, temporarily into a learn state, wherein, when operating in the learn state, the main unit is configured to acquire and store, in the main unit, a received security code.

5. The system of claim 4, wherein when not in the learn state, the main unit is configured to respond only to transmitted data packets comprising a security code stored in the main unit.

6. The system of claim 4, wherein the main unit comprises a second physically actuated switch, and the user input comprises actuation of the second physically actuated switch.

7. The system of claim 6, wherein the second physically actuated switch is a momentary contact switch, and the main unit is configured to transition into the learn state when the second physically actuated switch is actuated and to remain in the learn state while the second physically actuated switch remains actuated.

8. The system of claim 4, wherein the main unit comprises a second status indicator, and the main unit is configured to cause the status indicator to indicate when the main unit acquires and stores, in the main unit, a received security code.

9. The system of claim 8, wherein the second status indicator is a light emitting diode (LED), and the main unit is configured to cause the LED to flash when the main unit acquires and stores, in the main unit, a received security code.

10. The system of claim 1, wherein the main unit is configured to transmit data packets comprising information about the state of the main unit.

11. The system of claim 10, wherein the main unit is configured to transmit data packets comprising information about the state of the main unit when the state of the main unit changes.

12. The system of claim 11, wherein the main unit is configured also to transmit data packets comprising information about the state of the main unit when a time interval has elapsed since the last time the first remote unit transmitted information about the state of the main unit.

13. The system of claim 12, wherein the time interval is 10 seconds.

14. The system of claim 10, wherein the first remote unit is configured to cause the first status indicator to indicate the state of the main unit.

15. The system of claim 14, wherein the first status indicator is a light emitting diode (LED), and the first remote unit is configured to illuminate the LED when the main unit is operating in the second audio control state.

16. The system of claim 1, further comprising a second remote unit, the second remote unit comprising:

a third wireless transceiver, configured to transmit data packets to the second wireless transceiver; and a second physically actuated switch coupled to the third wireless transceiver;

wherein the main unit is configured to transition between the first audio control state and the second audio control state in response to actuation of the second physically actuated switch.

17. The system of claim 16, wherein:

the second remote unit comprises a second status indicator;

the first remote unit is configured to cause the first status indicator to indicate the state of the main unit; and the second remote unit is configured to cause the first status indicator to indicate the state of the main unit.

18. The system of claim 1, wherein the first physically actuated switch is a foot actuated switch.

19. The system of claim 1, wherein the first physically actuated switch is a hand actuated switch.

* * * * *